United States Patent
Furuya et al.

(10) Patent No.: US 6,355,345 B1
(45) Date of Patent: Mar. 12, 2002

(54) LAMINATE FILM FOR PREVENTING GLASS FROM SHATTERING

(75) Inventors: Koji Furuya; Shinya Watanabe; Shinichi Kawai; Kenji Suzuki, all of Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/581,133

(22) PCT Filed: Dec. 11, 1998

(86) PCT No.: PCT/JP98/05613

§ 371 Date: Jun. 9, 2000

§ 102(e) Date: Jun. 9, 2000

(87) PCT Pub. No.: WO99/30905

PCT Pub. Date: Jun. 24, 1999

(30) Foreign Application Priority Data

Dec. 12, 1997 (JP) .............................. 9-343049
Jan. 6, 1998 (JP) .......................... 10-000960
Jan. 19, 1998 (JP) .......................... 10-007638

(51) Int. Cl.[7] .............................................. B32B 15/04
(52) U.S. Cl. ....................................................... 428/343
(58) Field of Search .......................................... 428/343

(56) References Cited

FOREIGN PATENT DOCUMENTS

| JP | 63-194948 | 8/1988 | |
| JP | 7-156358 | 6/1995 | |
| JP | 7-80281 | 8/1995 | |
| WO | 97/01778 | 1/1997 | ............ G02B/5/28 |

OTHER PUBLICATIONS

"Novel Technology for UV and EB Curing, and Application and Development Thereof", CMC Co. Ltd., pp. 24–42, published Mar. 25, 1997.

*Primary Examiner*—Terressa M. Boykin
(74) *Attorney, Agent, or Firm*—Sughrue Mion, PLLC

(57) ABSTRACT

A laminate film for preventing glass from shattering, which comprises:

(A) a biaxially oriented polyester film of a copolyester containing ethylene-2,6-naphthalenedicarboxylate recurring units in an amount of at least 80 mol % of all recurring units, (B) an adhesive coating film on at least one side of the above biaxially oriented polyester film, (C) a hard coat layer on the above adhesive coating film, and (D) an antireflection layer on the above hard coat layer.

This laminate film has not only excellent adhesive properties, surface hardness and abrasion resistance but also sufficient transparency, antireflection property and glass shatterproof performance.

22 Claims, No Drawings

LAMINATE FILM FOR PREVENTING GLASS FROM SHATTERING

TECHNICAL FIELD

The present invention relates to a laminate film for preventing glass from shattering. More specifically, it relates to a laminate film for preventing glass from shattering, which has excellent adhesive properties, scratch resistance and impact resistance and is suitable for use as a surface-protecting material for a window pane, showcase, microwave oven door, plasma display panel, and Braun tube of a TV or monitor.

BACKGROUND ART

A biaxially oriented polyethylene-2,6-naphthalene dicarboxylate film receives attention for its use in various fields because it has excellent mechanical properties, heat resistance and chemical resistance as compared with a biaxially oriented polyethylene terephthalate film.

Particularly, recently, it receives attention for its use as a surface-protecting material having a glass shatterproof effect for its use in a window pane, showcase, microwave oven door, plasma display panel, or Braun tube of a TV or monitor. To be used as such a material, it is required to have not only excellent surface hardness and abrasion resistance but also sufficient transparency, antireflection property and glass shatterproof performance.

To meet such a requirement, an attempt is made to laminate a hard coat (HC) layer and an antireflection (AR) layer on a polyester film. The attempt, however, fails to give a satisfactory result because the adhesion of the layers to the polyester film is not sufficient.

JP-A 7-156358 discloses an easily adhesive film that has a coating layer, which is substantially formed of an aqueous polyester having a secondary transition temperature of 40 to 85° C. and which has a thickness of 0.05 to 0.3 µm, on the surface of a polyester film and that shows excellent adhesion to the medium layer of an inmold transfer film, for example, a medium layer of melamine resin.

JP-A 63-194948 discloses a flat, easily adhesive polyester film that has a coating film, which comprises polyurethane, acrylic resin, fatty acid amide or fatty acid bisamide, and a surface-roughening material (D) having an average particle diameter of 0.15 µm or less and which has a center line average surface roughness (Ra) of 0.002 to 0.01 µm, on the surface of a polyester film.

JP-B 7-80281 discloses a plastic laminate consisting of a polyethylene terephthalate layer, a polyester resin layer having a crystal fusion heat of 0.2 to 5 cal/g, and a radiation-curable layer. The above radiation-curable layer comprises a radiation-curable reaction product of a composition comprising monomers having at least two (meth) acryloyloxy groups in a molecule and N-vinylpyrrolidones.

DISCLOSURE OF THE INVENTION

It is an object of the present invention to provide a laminate film for preventing glass from shattering, which has not only excellent adhesion, surface hardness and scratch resistance but also sufficient transparency, antireflection capability and glass shatterproof performance.

It is another object of the present invention to provide a precursory laminate film that has excellent properties for the above laminate film of the present invention, and a base film therefor.

Still other objects and advantages of the present invention will be apparent from the following description.

According to the present invention, firstly, the above objects and advantages of the present invention are achieved by a laminate film for preventing glass from shattering, which comprises:

(A) a biaxially oriented polyester film of a copolyester containing ethylene-2,6-naphthalenedicarboxylate recurring units in an amount of at least 80 mol % of all recurring units, (B) an adhesive coating film on at least one side of the above biaxially oriented polyester film, the adhesive coating film comprising a composition which contains a water-soluble or dispersible polyester having a secondary transition temperature of 40 to 85° C. and at least one amide compound selected from the group consisting of fatty acid amide and fatty acid bisamide, (C) a hard coat layer on the above adhesive coating film, with the proviso that when the adhesive coating film is formed on both sides of the biaxially oriented polyester film, the hard coat layer is formed on only one of the adhesive coating films, and (D) an antireflection layer on the above hard coat layer.

Secondly, the above objects and advantages of the present invention are achieved by a precursory laminate film for preventing glass from shattering, which comprises:

(A) a biaxially oriented polyester film of a copolyester containing ethylene-2,6-naphthalenedicarboxylate recurring units in an amount of at least 80 mol % of all recurring units, and (B) an adhesive coating film on at least one side of the above biaxially oriented polyester film, the adhesive coating film comprising a composition which contains a water-soluble or dispersible polyester having a secondary transition temperature of 40 to 85° C. and at least one amide compound selected from the group consisting of fatty acid amide and fatty acid bisamide.

Thirdly, the above objects and advantages of the present invention are achieved by a base film for a laminate film for preventing glass from shattering, which (A) comprises (a) a copolyester containing ethylene-2,6-naphthalenedicarboxylate recurring units in an amount of at least 80 mol % of all recurring units and which has (b) a plane orientation coefficient of 0.250 or more and (c) an intrinsic viscosity of 0.45 dl/g or more.

DETAILED DESCRIPTION OF THE INVENTION

A biaxially oriented polyester film is used as a base film for the laminate film and precursory laminate film of the present invention.

The biaxially oriented polyester film comprises a copolyester containing ethylene-2,6-naphthalenedicarboxylate recurring units (will sometimes be referred to as PEN hereinafter) in an amount of at least 80 mol % of all recurring units.

That is, this PEN may be a homopolymer whose recurring units are all ethylene-2,6-naphthalenedicarboxylate recurring units or a copolymer which contains acid components other than 2,6-naphthalenedicarboxylic acid and/or glycol components other than ethylene glycol in such an amount that the amount of the ethylene-2,6-naphthalenedicarboxylate recurring units is 80 mol % or less. If the amount of polymerization units other than the ethylene-2,6-naphthalenedicarboxylate recurring units is less than 20 mol %, advantageously, the PEN film does not lose its inherent properties in the extreme and shows an excellent glass shatterproof performance when used at high temperatures.

If the amount of the polymerization units other than the ethylene-2,6-naphthalenedicarboxylate recurring units exceeds 20 mol %, the PEN film loses the properties inherent to the polyethylene-2,6-naphthalenecarboxylate film, whereby the impact resistance becomes insufficient, with the result that the glass shatterproof performance cannot be obtained in some cases.

The amount of the ethylene-2,6-naphthalenedicarboxylate recurring units contained is more preferably at least 85 mol %, particularly preferably at least 90 mol %.

Illustrative examples of the acid components other than 2,6-naphthalenedicarboxylic acid include dicarboxylic acids such as oxalic acid, adipic acid, phthalic acid, sebacic acid, dodecanedicarboxylic acid, isophthalic acid, terephthalic acid, 1,4-cyclohexanedicarboxylic acid, 4,4-diphenyldicarboxylic acid, phenylindandicarboxylic acid, 2,7-naphthalenedicarboxylic acid and diphenyletherdicarboxylic acid; oxycarboxylic acids such as p-oxybenzoic acid and p-oxyethoxybenzoic acid; and the like.

Preferable examples of the glycol components other than ethylene glycol include dihydroxy alcohols such as propylene glycol, trimethylene glycol, tetramethylene glycol, hexamethylene glycol, cyclohexanemethylene glycol, neopentylglycol, bisphenolsulfone adduct with ethylene oxide, bisphenol A adduct with ethylene oxide, diethylene glycol, polyethylene glycol and the like.

Part or all of the terminal hydroxyl groups and/or carboxyl groups of the PEN may be blocked by a monofunctional compound such as benzoic acid and methoxypolyalkylene glycol, or the PEN may be a copolymer that has been copolymerized with an ester-forming compound having three or more functional groups such as glycerin and pentaerythritol in such an extremely small amount that a substantially linear polymer can be obtained.

The biaxially oriented polyester film of the present invention may contain additives such as a stabilizer, lubricant or flame retardant.

Inert fine particles are preferably contained in a small amount in order to provide lubricity to the film. Illustrative examples of the inert fine particles include inorganic particles such as spherical silica, porous silica, calcium carbonate, alumina, titanium dioxide, kaolin clay, barium sulfate and zeolite and organic particles such as silicon resin particles and crosslinked polystyrene particles. Synthetic inorganic particles are preferred to natural ones because the former have a more uniform particle diameter than the latter. Inorganic particles having any crystal form, hardness, specific gravity and color can be used.

The average particle diameter of the above inert fine particles is preferably 0.05 to 5.0 $\mu$m, more preferably 0.1 to 3.0 $\mu$m.

The amount of the inert fine particles contained is preferably 0.001 to 1.0 wt %, more preferably 0.03 to 0.5 wt %.

The inert fine particles to be added to the film may comprise only one type or two or more types of the components selected from the above examples.

The time of adding the inert fine particles to the PEN is not particularly limited as long as they are added before the formation of the PEN film. They may be added at the time of polymerization or film-formation, for example.

The biaxially oriented polyester film of the present invention can be produced by biaxially stretching an unstretched film obtained in accordance with an ordinary method and then, heat-setting the stretched film in a specific temperature range.

For example, the unstretched film is stretched to 2.5 to 5.0 times both in a longitudinal direction and in a transverse direction at a temperature of Tg to (Tg+60)° C. and heat-set at a temperature of (Tg+50) to (Tg+140)° C. for 1 to 100 seconds. The unstretched film may be stretched in the two directions simultaneously, or sequentially, for example, in the longitudinal direction first and then in the transverse direction, in accordance with a commonly used method using a roll or stenter. The "Tg" as used herein is the glass transition temperature of a polymer.

The ratio of the longitudinal stretching ratio to the transverse stretching ratio is particularly preferably 0.85 to 1.15, and the heat-setting temperature is particularly preferably (Tg+60) to (Tg+110)° C.

The biaxially stretched film may be further stretched in the longitudinal direction and/or in the transverse direction.

The above biaxially oriented polyester film preferably has a plane orientation coefficient of 0.250 or more. When the plane orientation coefficient is smaller than 0.250, the glass shatterproof performance of the laminate lowers, so that the thickness non-uniformity of the film deteriorates. For this reason, when the film is coated on a Braun tube, for example, the light transmittance of the resulting tube is not uniform disadvantageously. The plane orientation coefficient is more preferably 0.252 to 0.275, particularly preferably 0.255 to 0.270.

The above biaxially oriented polyester film is formed of a PEN having an intrinsic viscosity of preferably 0.45 dl/g or more.

When the intrinsic viscosity is lower than 0.45 dl/g, burrs or cracks are formed on terminal of the surface at the time of cutting the film, whereby its processability lowers disadvantageously. The intrinsic viscosity is preferably 0.48 to 0.90 dl/g, particularly preferably 0.50 to 0.80 dl/g.

The sum and difference of Young directions intersecting at the right angle, for example, longitudinal direction and transverse direction, on the above biaxially oriented polyester film are preferably 900 kg/mm$^2$ or more and 100 kg/mm$^2$ or less, respectively.

If the sum of the Young moduli in the two directions intersecting at the right angle is less than 900 kg/mm$^2$, the glass shatterproof performance of the laminate is apt to be insufficient. The sum of the Young moduli is more preferably 950 to 1,600 kg/mm$^2$, particularly preferably 1,000 to 1,500 kg/mm$^2$.

If the difference in absolute value between the Youngs moduli is more than 100 kg/mm$^2$, the film strength in only one of the two directions is apt to be low, so that the laminate is liable to crack and the glass shatterproof performance is liable to be low. The difference is more preferably 0 to 50 kg/mm$^2$ in absolute value.

The biaxially oriented polyester film preferably has a thickness of 50 to 350 $\mu$m. When the thickness is less than 50 $\mu$m, the glass shatterproof performance is liable to be insufficient. When the thickness is more than 350 $\mu$m, it tends to be difficult to adhere the film onto glass. The thickness is more preferably 70 to 250 $\mu$m, particularly preferably 90 to 230 $\mu$m.

The biaxially oriented polyester film preferably has a haze of 5% or less. If the haze is more than 5%, the hazing of the film is observed more clearly and transparency thereof lowers disadvantageously. The haze is preferably 3% or less.

The biaxially oriented polyester film preferably has a center line average surface roughness (Ra) of 10 nm or less. If the Ra is more than 10 nm, the surface reflection caused by the unevenness of the surface can be noticed with the naked eye and the transparency of the film is apt to be low disadvantageously. The Ra is more preferably 8 nm or less, particularly preferably 7 nm or less.

The laminate film and precursory laminate film of the present invention have an adhesive coating film on at least one side of the above biaxially oriented polyester film. The adhesive coating film comprises a composition containing a water-soluble or dispersible polyester having a secondary transition temperature of 40 to 85° C. and at least one amide compound selected from the group consisting of fatty acid amide and fatty acid bisamide.

If the secondary transition temperature Tg of the water-soluble or dispersible polyester is less than 40° C., the obtained film is low in heat resistance and anti-blocking property. On the other hand, if the Tg is more than 85° C., the obtained film is low in adhesive property. The secondary transition temperature is preferably 45 to 80° C.

The above polyester is constituted by the following polyvalentcarboxylic acids and polyvalenthydroxyl compounds. Illustrative examples of the polyvalentcarboxylic acids include terephthalic acid, isophthalic acid, orthophthalic acid, 4,4-diphenyldicarboxylic acid, 2,5-naphthalenedicarboxylic acid, 2,6-naphthalenedicarboxylic acid, 1,4-cyclohexanedicarboxylic acid, potassium 2-sulfoterephthalate, sodium 5-sulfoisophthalate, adipic acid, azelaic acid, sebacic acid, dodecanedicarboxylic acid, glutaric acid, succinic acid, trimellitic acid, trimesic acid, trimellitic anhydride, phthalic anhydride, p-hydroxybenzoic acid, trimellitic acid monopotassium salt and ester-forming derivatives of these. Illustrative examples of the polyvalenthydroxyl compounds include ethylene glycol, 1,2-propyleneglycol, 1,3-propyleneglycol, 1,4-butane diol, 1,6-hexane diol, 2-methyl-1,5-pentane diol, neopentyl glycol, 1,4-cyclohexane dimethanol, p-xylylene glycol, bisphenol A adduct with ethylene glycol, bisphenol A adduct with 1,2-propylene glycol, diethylene glycol, triethylene glycol, polyethylene glycol, polypropylene glycol, polytetramethylene glycol, polytetramethylene oxide glycol, dimethylol propionic acid, glycerin, trimethylol propane, sodium dimethylol ethyl sulfonate, potassium dimethylol propionate and the like. Polyester resins are synthesized by suitably selecting at least one of the polycarboxylic acids and at least one of the polyhydroxyl compounds and subjecting them to a polycondensation reaction in accordance with a common method. Other than the above acids and compounds, a composite polymer having a polyester component such as polyester urethane, which is obtained by extending the chain of polyester polyol with isocyanate, can also be used as the above polyester.

The water-soluble or dispersible polyester can be contained in a composition forming a coating film in an amount of 20 to 97 wt %.

As the amide compound can be used fatty acid amide and fatty acid bisamide.

The fatty acid amide is preferably one that is represented by the following formula:

$R^1CONH_2$ 

wherein $R^1$ is a saturated or unsaturated aliphatic group having 6 to 22 carbon atoms.

The fatty acid bisamide is preferably one that is represented by the following formula:

$R^2CONHR^3NHCOR^4$ 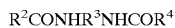

wherein $R^2$ and $R^4$ are independently a saturated or unsaturated aliphatic group having 6 to 22 carbon atoms and $R^3$ is a saturated or unsaturated aliphatic group having 1 to 15 carbon atoms.

Of these, the fatty acid bisamide is more preferable. Illustrative examples of the fatty acid amide include linolic acid amide, caprylic acid amide and stearic acid amide.

The fatty acid bisamide is preferably N,N'-alkylene bisamide having a molecular weight of 200 to 800. Illustrative examples of the N,N'-alkylene bisamide include N,N'-methylenebisstearic acid amide,
N,N'-ethylenebispalmitic acid amide,
N,N'-methylenebislauric acid amide and the like.

The above amide compound is particularly preferably the fatty acid bisamide of the above formula in which $R^3$ is a methylene group ($CH_2$) or an ethylene group ($CH_2CH_2$).

The above amide compounds may be used singly or in combination of two or more.

These amide compounds are preferably contained in the composition forming the coating film in an amount of 3 to 10 wt %. If the amount of the amide compound contained is too small, sufficient adhesion cannot be obtained, so that lubricity and anti-blocking property are apt to lower. On the other hand, if the amount is too large, adhesion between the film and the coating film lowers, the coating film is embrittled and a haze is increased.

It is preferable to add 5 to 30 wt % of lubricant, i.e., inert fine particles having an average particle diameter of 0.15 μm or less, to the adhesive coating film in the present invention.

Illustrative examples of the above inert fine particles include inorganic fine particles such as calcium carbonate, magnesium carbonate, calcium oxide, zinc oxide, magnesium oxide, silicon oxide, sodium silicate, aluminum hydroxide, iron oxide, zirconium oxide, barium sulfate, titanium oxide, tin oxide, antimony trioxide, carbon black and molybdenum disulfate; and organic fine particles such as acryl-based crosslinked polymer, styrene-based crosslinked polymer, silicone resin, fluorine resin, benzoguanamine resin, phenol resin, nylon resin, polyethylene wax and the like.

The inert fine particles not only roughen the surface of the coating film but also enforce the coating film by itself. Furthermore, they provide an anti-blocking property to the coating film and excellent lubricity to the film.

These inert fine particles are preferably contained in the composition forming the coating film in an amount of 5 to 30 wt %. In particular, the amount of the inert fine particles contained is preferably 5 to 10 wt % when they have relatively large particle diameters whose average is 0.1 μm or more, while it is preferably 8 to 30 wt % when they have relatively small particle diameters whose average is 0.01 to 0.1 μm.

The friction coefficient (μs) of the adhesive coating film in the present invention is preferably 0.8 or less.

The above composition used in the present invention is used in the form of an aqueous solution, water-dispersible solution or emulsion to form the coating film. In the case of a water-dispersible polyester, an organic solvent can be contained in a slight amount as a dispersing auxiliary agent. To form the coating film, resins other than the above polyesters, surfactants, antistatic agents, anti-foaming agents, coating-property-modifying agents, viscosity improver, organic lubricants, foaming agents, dyes, pigments, ultraviolet absorbers and the like may also be added as required.

Surfactants such as an anionic surfactant, cationic surfactant and nonionic surfactant can be used in a required amount as the above surfactants. The surfactants are preferably those which can reduce the surface tension of an aqueous coating solution to 40 dyne/cm or less to promote the wetting to the polyester film. Illustrative examples of the surfactants include polyoxyethylene alkylphenyl ethers, polyoxyethylene-fatty esters, sorbitan fatty esters, glycerin fatty esters, fatty acid metallic soap, alkylsulfuric acid salts, alkylsulfonic acid salts, alkylsulfosuccinic acid salts, quaternary ammonium chloride salts, alkylamine hydrochloric acid, betaine surfactants and the like.

Antistatic agents such as an anionic antistatic agent, cationic antistatic agent, nonionic antistatic agent, ampholytic antistatic agent and polymeric antistatic agent can be used in a required amount as the above antistatic agents. Illustrative examples of the antistatic agents include glycerin fatty acid esters, polyoxyethylene alkyl ethers, polyoxyethylene alkylphenyl ethers, polyoxyethylene alkyl amines, polyoxyethylene alkyl amine fatty esters, N,N'-bis (2-hydroxyethyl)alkyl amines, alkyldiethanolamides, alkylsulfonic acid salts, alkylbenzenesulfonic acid salts, alkyl phosphates, tetraalkylammonium salts, trialkylbenzylammonium salts, alkyl betaines, alkyl imidazolium betaines, polyethylene oxides, polyether amide imides, ethylene oxide-epihalohydrin copolymers, quaternary ammonium salt group-containing (meth)acrylate copolymers, quaternary ammonium salt group-containing maleimide copolymers, quaternary ammonium salt group-containing methacrylimide copolymers, sodium polystyrene sulfonates, carbobetaine graft copolymers and the like.

Other than these, the easily adhesive coating film may contain crosslinking agents such as isocyanate compounds, epoxy compounds, oxazoline compounds, aziridine compounds, melamine compounds, silane coupling agents, titanic coupling agents and zirco-aluminate coupling agents, for the purpose of improving the sticking property (blocking property), water resistance, solvent resistance and mechanical strength. If the resin component of the easily adhesive coating film has a crosslinking reaction point, the coating film may further contain reaction initiators such as peroxides and amines and a photosensitive resin may further contain photosensitizers.

The coating of the coating solution onto the biaxially oriented polyester film may be carried out at any stage. It is, however, preferably carried out during the formation of the film, more preferably before the completion of orientation and crystallization of the film.

The "film before the completion of orientation and crystallization" as used herein includes an unstretched film, a uniaxially oriented film obtained by orienting an unstretched film either in a longitudinal direction or in a transverse direction, a biaxially oriented film obtained by orienting an unstretched film both in a longitudinal direction and in a transverse direction at low stretching ratios (a biaxially oriented film before eventually restretching the resulting film either in the longitudinal direction or in the transverse direction to complete the orientation and crystallization), and the like.

Above all, it is preferable that the unstretched film or the uniaxially oriented film obtained by orienting in one direction be coated with the coating solution of the above composition, then stretched in the longitudinal direction and/or the transverse direction and heat-set. The solid content of the coating solution is generally 0.1 to 30 wt %, preferably 1 to 10 wt %.

To improve the coating property of the coating solution when it is coated on the film, it is preferable as a pretreatment that the surface of the film be subjected to physical treatments such as corona surface treatment, flame treatment and plasma treatment or that the coating film composition and a surfactant which is chemically inert to the composition be used in combination. Such a surfactant is one that promotes the wetting of the aqueous coating solution to the film. Illustrative examples of the surfactant include anionic and nonionic surfactants such as polyoxyethylene alkylphenyl ethers, polyoxyethylene-fatty esters, sorbitan fatty esters, glycerin fatty esters, fatty acid metallic soap, alkylsulfuric acid salts, alkylsulfonic acid salts, alkylsulfosuccinic acid salts and the like.

The coating solution is preferably coated in an amount of 0.5 to 50 g per $m^2$ of the film or in such an amount that the thickness of the coating film (in terms of solid content after dried) is to be 0.02 to 0.3 $\mu$m, preferably 0.07 to 0.25 $\mu$m. If the thickness of the coating film is too small, adhesive strength thereof is insufficient. If the thickness is too large, on the other hand, the base film may have blocking or the laminate may have an increased haze value.

The coating solution may be coated by any known coating method such as roll coating, gravure coating, roll brushing, spray coating, air-knife coating, immersion coating and curtain coating. These methods may be used solely or in combination. The coating film may be formed on only one side or both sides of the film as required.

In the present invention, a hard coat layer is laminated on the side of the base film on which the above coating film has been formed. At this point, the hard coat layer is formed on only one side of the base film when the coating film has been formed on both sides of the base film.

As the hard coat layer may be used radiation-curable or silane-based hard coat layers that are generally used. Particularly preferable are radiation-curable hard coat layers, the most preferable of which are ultraviolet-cured hard coat layers.

Illustrative examples of ultraviolet-cured compositions that are used in forming the hard coat layer include urethane-acrylate-based, epoxy-acrylate-based or polyester-acrylate-based ultraviolet-cured compositions. These compositions are disclosed, for example, in JP-B7-80281 and "Novel technology for UV and EB curing, and application and development thereof" (PP. 24 to 42)(CMC Co., Ltd., published on Mar. 25, 1997).

To form the hard coat layer on the adhesive coating film, the composition is coated on the coating film and cured by application of heat or irradiation of radiation (such as ultraviolet light). The thickness of the hard coat layer is not particularly limited but is suitably about 1 to 15 $\mu$m.

In the laminate film of the present invention, an antireflection layer is further formed on the hard coat layer thus formed.

The antireflection layer may comprise a laminate in which an oxide layer having a larger refractive index and an oxide layer having a smaller refractive index are laminated alternately. The larger refractive index is 2.4 to 3.3 and the smaller refractive index is 1.3 to 2.2, for example.

The laminate may have a layer structure comprising a layer having a smaller refractive index ($SiO_2$, 30 nm), a layer having a larger refractive index ($TiO_2$, 30 nm), a layer having a smaller refractive index ($SiO_2$, 30 nm), a layer having a larger refractive index ($TiO_2$, 100 nm) and a layer having a smaller refractive index ($SiO_2$, 100 nm); a layer structure comprising a layer having a larger refractive index (ITO, 20 m), a layer having a smaller refractive index (AlSiO, 20 nm), a layer having a larger refractive index (ITO, 88 nm) and a layer having a smaller refractive index (AlSiO, 88 nm); a layer structure comprising a layer having a larger refractive index (ITO, 20 nm), a layer having a smaller refractive index ($SiO_2$, 20 nm), a conductive layer having a larger refractive index (ITO, 93 nm) and a layer having a smaller refractive index ($SiO_2$, 93 nm).

In the present invention, any antireflection layer can be used, and it is generally formed on the hard coat layer by sputtering.

The laminate film of the present invention in which the hard coat layer and the antireflection layer have been formed on the adhesive coating film by the above method preferably has a haze of 5% or less. If the haze is more than 5%, the hazing of the laminate becomes more distinct, which may make it difficult to use the laminate film in such applications in which transparency is essential, as a Braun tube and window pane. The haze is more preferably 3% or less.

The laminate film of the present invention is coated on the surface of glass in such a way that the antireflection layer is to be the outermost layer, in order to prevent the glass from shattering at the time of its breakage.

When the biaxially oriented polyester film which is a base film of the laminate film has the adhesive coating film on its both sides, coating of the laminate film to the glass surface may be conducted by providing a pressure sensitive adhesive layer onto the adhesive coating film. When the biaxially oriented polyester film has the adhesive coating film only on one side, the pressure sensitive adhesive layer is formed on the side on which the adhesive coating film is not formed, whereby the laminate film is coated on glass. It is more preferable to form the adhesive coating film on both sides of the base film because the adhesion between the laminate film and the pressure sensitive adhesive layer is stronger.

Illustrative examples of the pressure sensitive adhesive include rubber adhesives such as a latex pressure sensitive adhesive, butyl rubber pressure sensitive adhesive and styrene-based block copolymer-based pressure sensitive adhesive; acrylic pressure sensitive adhesives; polyether pressure sensitive adhesives; and silicon pressure sensitive adhesives. The pressure sensitive adhesive is not particularly limited as long as it can firmly adhere the laminate film on the surface of glass and it itself can secure transparency.

The means of curing the pressure sensitive adhesive used to firmly adhere the laminate film to the glass include the irradiation of ultraviolet, exposure to electromagnetic wave and application of heat, and are not particularly limited. The means of curing the pressure sensitive adhesive by irradiating ultraviolet through the laminate film is, however, not appropriate in the present invention because the biaxially oriented film of the present invention prevents the ultraviolet from reaching the adhesive, which is therefore not cured.

It is preferable to form the pressure sensitive adhesive layer by coating. On the adhesive layer is preferably formed a release film for the purpose of protecting the adhesive layer. The release film is peeled from the adhesive layer before the use of the laminate film, and the above laminate is then coated on glass with the adhesive layer in contact with the glass.

The glass surface to which the laminate film is adhered may be that of an image display device such as a Braun tube or plasma display.

Therefore, by using the laminate film of the present invention, there is provided, for example, an image display device which has the laminate film of the present invention coated on its outer glass surface in such a way that the antireflection layer of the laminate film is to be the outermost surface.

EXAMPLES

The present invention will be further illustrated with reference to Examples hereinafter and is not limited thereto as long as it does not deviate from the scope of the invention. Physical properties are measured in accordance with the following methods.

(1) Measurement of Purity of Ethylene-2,6-naphthalene Dicarboxylate

A film sample is dissolved in a measuring solvent ($CDCl_3:CF_3COOD=1:1$), and the resulting solution is measured by $^1H$-NMR. The purity of ethylene-2,6-naphthalene dicarboxylate is calculated from the ratios in the integrals of the obtained signals.

(2) Young's Modulus

A sample having a width of 10 mm and a length of 150 mm is cut out of the film and pulled by an Instron-type universal tensile tester at chuck intervals of 100 mm, a pulling rate of 10 mm/min and a chart speed of 500 mm/min. The Young's module of the film is calculated from a tangent at a rising portion of the obtained load-elongation curve.

(3) Plane Orientation Coefficient (ns)

The plane orientation coefficient is measured using an Abbe's refractometer of K.K. ATAGO for refractive indices $n_{MD}$ in a longitudinal direction (MD) and $n_{TD}$ in a transverse direction (TD) on the surface of the film and a refractive index $n_Z$ in a thickness direction (Z) of the film, and is calculated by inserting the refractive indices in the following expression, using Na-D line at 25° C. The measurement is made on both surface sides of the film, and the average value of all the ns values obtained is taken as the plane orientation coefficient (ns).

$$ns=\{(n_{MD}+n_{TD})/2\}-n_Z$$

(4) Intrinsic Viscosity

The intrinsic viscosity (unit: dl/g) is measured at 25° C. using o-chlorophenol as a solvent (5) Surface Roughness (Ra)

Measurement is made on both surface sides of the film for surface roughness (Ra) (unit: nm) by a surface roughness meter (Surfcom 111A, a product of Tokyo Seimitsu Co., Ltd.).

(6) Haze

The haze value of one layer film or the total haze value of the laminate film is measured using the haze measuring device (NDH-20) of Nippon Denshoku Kogyo Co., Ltd. in accordance with the method of JIS K 6714.

(7) Friction Coefficient ($\mu s$)

A static friction coefficient between the surface coated with the coating film and the polyethylene-2,6-naphthalene dicarboxylate film (the surface without the coating film) is measured using the slippery measuring device of Toyo Tester Co., Ltd. in accordance with ASTM D1894-63 and taken as the friction coefficient ($\mu s$). The sled plate is a glass plate and the load is 1kg. The slipperiness of the film is evaluated based on the following criterion.

| ⊚: | friction coefficient ($\mu s$) ≦ 0.5 | ... extremely good |
|---|---|---|
| ○: | 0.5 < friction coefficient ($\mu s$) ≦ 0.8 | ... good |
| X: | 0.8 < friction coefficient ($\mu s$) | ... poor |

(8) Adhesion

A hard coat layer having a thickness of 5 $\mu m$ is formed on the side, on which the easily adhesive coating film has been formed, of the polyethylene-2,6-naphthalene dicarboxylate film, the resulting surface is cut into 100 squares each of which has a size of 1 $mm^2$, the 24-mm-wide cellophane tape of Nichiban Company, Ltd. is stuck on its surface, and the tape is at one stroke peeled off at a peeling angle of 180°. The peeled area of the surface is observed to evaluate the adhesion based on the following criterion.

| | | |
|---|---|---|
| 5: | peeled area < 10% | ... extremely good |
| 4: | 10% ≦ peeled area < 20% | ... good |
| 3: | 20% ≦ peeled area < 30% | ... at the lowest usable level |
| 2: | 30% ≦ peeled area < 40% | ... poor |
| 1: | 40% ≦ peeled area | ... extremely poor |

(9) Scratch Resistance

A pencil scratch test is made on the surface of the laminate film (on the hard coat layer side when the hard coat layer is formed) using the pencil hardness tester of Marubishi Kagaku-Kikai Seisakusho Co., Ltd. in accordance with JIS K 5400. The test is conducted with a pencil held vertically on the film while applying a load of 500 g on the pencil. The scratch resistance of the film is evaluated based on the following criterion.

○: 2H≦pencil hardness ... good

X: pencil hardness≦H ... poor

(10) Reflectance

The ratios of reflected light fluxes to incident light fluxes vertical to the surface of the laminate are measured within the wave length range of 400 to 570 nm. The average of the ratios is taken as the reflectance.

(11) Anti-blocking Property

One laminate film is placed on another laminate film in such a way that the coating film-coated side of one of the films is in contact with the non-coated side of the other film, and a pressure of 6 kg/cm² is applied to the films for 17 hours under the atmosphere of 60° C. and 80%RH. Thereafter, the films are peeled off from each other (peeling direction: 180°, peeling rate: 100 mm/min), and the anti-blocking property is evaluated by the peel strength (g/5 cm in width) based on the following criterion.

| | | |
|---|---|---|
| ⊚: | peel strength < 10 | ... extremely good |
| ○: | 10 ≦ peel strength < 15 | ... good |
| Δ: | 15 ≦ peel strength < 20 | ... slightly poor |
| X: | 20 ≦ peel strength | ... poor |

(12) Impact Resistance (glass shatterproof effect)

The impact resistance of the film is measured in accordance with the weight falling impact testing method of JIS K 7211 and calculated in terms of impact energy (E50). (The tip of the weight used has a diameter of 4 mm.) Evaluation of impact resistance (glass shatterproof effect)

○ (good): impact energy (E50)≧1.00 (J)

Δ (usable): 1.00>impact energy (E50)≧0.45 (J)

X (not usable): impact energy (E50)<0.45 (J)

Example 1

Polyethylene-2,6-naphthalenedicarboxylate having an intrinsic viscosity of 0.60 dl/g was extruded from a die and cooled on a cooling drum in accordance with a common method to prepare an unstretched film. Then, after the unstretched film was stretched to 3.8 times in a longitudinal direction, an 8% aqueous solution of the following coating film composition was uniformly coated on one side of the stretched film by a roll coater. Table 1 shows the properties of the biaxially oriented polyester film.

<Coating Film Composition>

| | |
|---|---|
| A copolyester (Tg = 68° C.) consisting of terephthalic acid (90 mol %), isophthalic acid (6 mol %) and potassium 5-sulfoisophthalate (4 mol %) as acid components and ethylene glycol (95 mol %) and neopentyl glycol (5 mol %) as glycol components | 80 wt % |
| N,N'-ethylenebiscaprylic acid amide | 5 wt % |
| acrylic resin fine particles (average particle diameter 0.03 μm) | 10 wt % |
| polyoxyethylene nonylphenylether | 5 wt % |

Thereafter, the film was stretched to 4.0 times in a transverse direction and heat-set at 210° C. to obtain an adhesive film having a thickness of 150 μm. The thickness of the coating film was 0.15 μm.

Then, a UV cured composition having the following composition was uniformly coated on the coating film by a roll coater to form a cured film having a thickness of 5 μm.

<UV Cured Composition>

| | |
|---|---|
| pentaerythritol acrylate | 45 wt % |
| N-methylol acrylamide | 40 wt % |
| N-vinyl pyrrolidone | 10 wt % |
| 1-hydroxycyclohexylphenylketone | 5 wt % |

Thereafter, the resulting coating film was exposed to a UV light from a high-pressure mercury-vapor lamp having a strength of 80 W/cm for 30 seconds to cure to form a hard coat layer. According to the aforementioned evaluation criterion, the adhesive strength in this case was at a level of 4.

On this hard coat layer was formed a layer having a smaller refractive index (SiO₂, 30 nm), a layer having a larger refractive index (TiO₂, 30 nm), a layer having a smaller refractive index (SiO₂, 30 nm), a layer having a larger refractive index (TiO₂, 100 nm) and a layer having a smaller refractive index (SiO₂, 100 nm) in this order by sputtering.

The obtained laminate had small reflection with a reflectance of 0.7% and excellent scratch resistance and glass shatterproof effect.

Comparative Example 1

A laminate was prepared in the same manner as in Example 1 except that a coating film composition which contained no N,N'-ethylenebiscaprlyic acid amide was used. The evaluation result of the laminate is shown in Table 3. This laminate had abrasion resistance and reflectance that were equivalent to those of the laminate of Example 1, while the level of adhesive strength thereof, which had been evaluated in the same manner as in Example 1, was as poor as 2.

Examples 2 to 9 and Comparative Examples 2 to 4

Laminates were obtained in the same manner as in Example 1 except that the composition of the coating film composition was changed as shown in Table 2. The evaluation results of the laminates are shown in Table 3.

Examples 10 to 13

Laminates were obtained in the same manner as in Example 4 except that the amount of N,N'-methylenebis stearic acid amide contained in the coating composition was changed as shown in Table 2. The evaluation results of the laminates are shown in Table 3. All the laminates had an excellent glass shatterproof effect. Particularly excellent adhesive strength was obtained when the amount of the fatty acid bisamide contained was 3 to 10 wt % (Examples 11 and 12).

Examples 14 to 19

The lubricant contained in the coating film composition in Example 4 and amount thereof were changed as shown in Table 2. The results are shown in Table 3. The laminates of the present invention (Examples 14 to 19) showed excellent adhesion, glass shatterproof effect and lubricity.

Example 20

A UV cured composition having the following composition was uniformly coated on the coating film of the adhesive polyester film obtained in Example 5 by a roll coater to obtain a cured film having a thickness of 5 μm.
<UV Cured Composition>

| | |
|---|---|
| pentaerythritol triacrylate | 20 wt % |
| N-methylol acrylamide | 40 wt % |
| trimethylol propane triacrylate | 25 wt % |
| N-vinyl pyrrolidone | 10 wt % |
| P-phenoxydichloroacetophenone | 5 wt % |

Thereafter, the coating film was exposed to a UV light from a high-pressure mercury-vapor lamp having a strength of 80 W/cm for 30 seconds and cured to form a hard coat layer. The laminate strength in this case was at a level of 4. On this hard coat layer was formed a layer having a larger refractive index (ITO, 20 nm), a layer having a smaller refractive index (AlSiO, 20 nm), a layer having a larger refractive index (ITO, 80 nm) and a layer having a smaller refractive index (AlSiO, 88 nm) in this order by sputtering.

The obtained laminate had small reflection with a reflectance of 0.7% and excellent scratch resistance and glass shatterproof effect.

Comparative Examples 5 and 6

Laminate films having different friction coefficients ($\mu s$) were obtained in the same manner as in Example 4 except that the lubricant contained in the coating film composition of Example 4 and amount thereof were changed as shown in Table 2. The evaluation results of these films are shown in Table 3. All these films had an excellent glass shatterproof effect. However, these films had poor lubricity and insufficient winding property, handling property and anti-blocking property because they had a friction coefficient ($\mu s$) of more than 0.8.

Examples 21 to 23 and Comparative Examples 7 and 8

Laminates were prepared in the same manner as in Example 1 except that the film-formation condition was changed to those shown in Table 1. The properties of these laminates are shown in Table 3.

Example 24

A laminate was prepared in the same manner as in Example 1 except that polyethylene-2,6-naphthalene dicarbdxylate having an intrinsic viscosity of 0.55 dl/g was used. The film of this Example had an intrinsic viscosity of 0.48 dl/g. The properties of this laminate are shown in Table 3.

Example 25

A laminate was prepared in the same manner as in Example 1 except that a copolyester having an intrinsic viscosity. of 0.60 dl/g (comprising 90 mol % of ethylene-2,6-naphthalene dicarboxylate units and 10 mol % of bis(4-(2-hydroxyethbxy)phenyl)sulfone-2,6-naphthalene dicarboxylate units (abbreviated as "BPS-EO" in Tables)) was used. The film of this Example had an intrinsic viscosity of 0.51 dl/g. The properties of this laminate are shown in Table 3.

Example 26

A laminate was prepared in the same manner as in Example 1 except that a copolyester having an intrinsic viscosity of 0.60 dl/g (comprising 85 mol % of ethylene-2,6-naphthalene dicarboxylate units, 15 mol % of ethylene isophthalate units (abbreviated as "IA" in Tables) and 100 mol % of ethylene glycol) was used. The film of this Example had an intrinsic viscosity of 0.50 dl/g. The properties of this laminate are shown in Table 3.

Comparative Example 9

A laminate was prepared in the same manner as in Example 1 except that polyethylene-2,6-naphthalene dicarboxylate having an intrinsic viscosity of 0.48 dl/g was used. The film of this Comparative Example had an intrinsic viscosity of 0.42 dl/g. The properties of this laminate are shown in Table 3.

Comparative Example 10

A laminate was prepared in the same manner as in Example 1 except that a copolyester having an intrinsic viscosity of 0.60 dl/g (comprising 75 mol % of ethylene-2,6-naphthalene dicarboxylate units, 25 mol % of ethylene isophthalate units (abbreviated as "IA" in Tables) and 100 mol % of ethylene glycol) was used. The film of this Comparative Example had an intrinsic viscosity of 0.48 dl/g. The properties of this laminate are shown in Table 3.

Example 27

The procedure of Example 1 was repeated except that the unstretched film was biaxially stretched to 3.5 times in a longitudinal direction (in a direction of machine shaft) and to 4.0 times in a transverse direction (in a breadth direction) in a sequential manner. The result is shown in Table 3.

Comparative Example 11

The procedure of Example 1 was repeated except that the unstretched film was biaxially stretched to 2.8 times in a longitudinal direction (in a direction of machine shaft) and to 4.0 times in a transverse direction (in a breadth direction) in a sequential manner. The result is shown in Table 3.

TABLE 1

| | main component polymer | | copolymer component | | stretching ratio | | heat-setting temperature | film thickness | plane orientation coefficient of film |
|---|---|---|---|---|---|---|---|---|---|
| | type | mol % | type | mol % | MD | TD | (° C.) | (μm) | (ns) |
| Ex. 1 | PEN | 100 | — | — | 3.8 | 4.0 | 210 | 150 | 0.265 |
| Ex. 2 | PEN | 100 | — | — | 3.8 | 4.0 | 210 | 150 | 0.265 |
| Ex. 3 | PEN | 100 | — | — | 3.8 | 4.0 | 210 | 150 | 0.265 |
| Ex. 4 | PEN | 100 | — | — | 3.8 | 4.0 | 210 | 150 | 0.265 |
| Ex. 5 | PEN | 100 | — | — | 3.8 | 4.0 | 210 | 150 | 0.265 |
| Ex. 6 | PEN | 100 | — | — | 3.8 | 4.0 | 210 | 150 | 0.265 |
| Ex. 7 | PEN | 100 | — | — | 3.8 | 4.0 | 210 | 150 | 0.265 |
| Ex. 8 | PEN | 100 | — | — | 3.8 | 4.0 | 210 | 150 | 0.265 |
| Ex. 9 | PEN | 100 | — | — | 3.8 | 4.0 | 210 | 150 | 0.265 |
| Ex. 10 | PEN | 100 | — | — | 3.8 | 4.0 | 210 | 150 | 0.265 |
| Ex. 11 | PEN | 100 | — | — | 3.8 | 4.0 | 210 | 150 | 0.265 |
| Ex. 12 | PEN | 100 | — | — | 3.8 | 4.0 | 210 | 150 | 0.265 |
| Ex. 13 | PEN | 100 | — | — | 3.8 | 4.0 | 210 | 150 | 0.265 |
| Ex. 14 | PEN | 100 | — | — | 3.8 | 4.0 | 210 | 150 | 0.265 |

| | Young's modulus of film (kg/mm$^2$) | | total of Young's moduli in MD and TD | difference in Young's moduli between MD and TD in absolute value | intrinsic viscosity of film | surface roughness Ra of film | haze of film | haze of laminate film |
|---|---|---|---|---|---|---|---|---|
| | MD | TD | (kg/mm$^2$) | (kg/mm$^2$) | (dl/g) | (nm) | (%) | (%) |
| Ex. 1 | 650 | 660 | 1310 | 10 | 0.55 | 5 | 2.0 | 2.0 |
| Ex. 2 | 650 | 660 | 1310 | 10 | 0.55 | 5 | 2.0 | 2.0 |
| Ex. 3 | 650 | 660 | 1310 | 10 | 0.55 | 5 | 2.0 | 2.0 |
| Ex. 4 | 650 | 660 | 1310 | 10 | 0.55 | 5 | 2.0 | 2.0 |
| Ex. 5 | 650 | 660 | 1310 | 10 | 0.55 | 5 | 2.0 | 2.0 |
| Ex. 6 | 650 | 660 | 1340 | 10 | 0.55 | 5 | 2.0 | 2.0 |
| Ex. 7 | 650 | 660 | 1310 | 10 | 0.55 | 5 | 2.0 | 2.0 |
| Ex. 8 | 650 | 660 | 1310 | 10 | 0.55 | 5 | 2.0 | 2.0 |
| Ex. 9 | 650 | 660 | 1310 | 10 | 0.55 | 5 | 2.0 | 2.0 |
| Ex. 10 | 650 | 660 | 1310 | 10 | 0.55 | 5 | 2.0 | 2.0 |
| Ex. 11 | 650 | 660 | 1310 | 10 | 0.55 | 5 | 2.0 | 2.0 |
| Ex. 12 | 650 | 660 | 1310 | 10 | 0.55 | 5 | 2.0 | 2.0 |
| Ex. 13 | 650 | 660 | 1310 | 10 | 0.55 | 5 | 2.0 | 2.0 |
| Ex. 14 | 650 | 660 | 1310 | 10 | 0.55 | 5 | 2.0 | 2.0 |

| | main component polymer | | copolymer component | | stretching ratio | | heat-setting temperature | film thickness | plane orientation coefficient of film |
|---|---|---|---|---|---|---|---|---|---|
| | type | mol % | type | mol % | MD | TD | (° C.) | (μm) | (ns) |
| Ex. 15 | PEN | 100 | — | — | 3.8 | 4.0 | 210 | 150 | 0.265 |
| Ex. 16 | PEN | 100 | — | — | 3.8 | 4.0 | 210 | 150 | 0.265 |
| Ex. 17 | PEN | 100 | — | — | 3.8 | 4.0 | 210 | 150 | 0.265 |
| Ex. 18 | PEN | 100 | — | — | 3.8 | 4.0 | 210 | 150 | 0.265 |
| Ex. 19 | PEN | 100 | — | — | 3.8 | 4.0 | 210 | 150 | 0.265 |
| Ex. 20 | PEN | 100 | — | — | 3.8 | 4.0 | 210 | 150 | 0.265 |
| Ex. 21 | PEN | 100 | — | — | 2.8 | 2.9 | 210 | 150 | 0.253 |
| Ex. 22 | PEN | 100 | — | — | 3.8 | 4.0 | 190 | 150 | 0.260 |
| Ex. 23 | PEN | 100 | — | — | 3.8 | 4.0 | 225 | 150 | 0.255 |
| Ex. 24 | PEN | 100 | — | — | 3.8 | 4.0 | 210 | 150 | 0.267 |
| Ex. 25 | PEN | 90 | BPS-EO | 10 | 3.8 | 4.0 | 210 | 150 | 0.258 |
| Ex. 26 | PEN | 85 | IA | 15 | 3.8 | 4.0 | 210 | 150 | 0.252 |
| Ex. 27 | PEN | 100 | — | — | 3.5 | 4.0 | 210 | 150 | 0.262 |

| | Young's modulus of film (kg/mm$^2$) | | total of Young's moduli in MD and TD | difference in Young's moduli between MD and TD in absolute value | intrinsic viscosity of film | surface roughness Ra of film | haze of film | haze of laminate film |
|---|---|---|---|---|---|---|---|---|
| | MD | TD | (kg/mm$^2$) | (kg/mm$^2$) | (dl/g) | (nm) | (%) | (%) |
| Ex. 15 | 650 | 660 | 1310 | 10 | 0.55 | 5 | 2.0 | 2.1 |
| Ex. 16 | 650 | 660 | 1310 | 10 | 0.55 | 5 | 2.0 | 2.0 |
| Ex. 17 | 650 | 660 | 1310 | 10 | 0.55 | 5 | 2.0 | 2.0 |
| Ex. 18 | 650 | 660 | 1310 | 10 | 0.55 | 5 | 2.0 | 2.0 |
| Ex. 19 | 650 | 660 | 1310 | 10 | 0.55 | 5 | 2.0 | 2.0 |
| Ex. 20 | 650 | 660 | 1310 | 10 | 0.55 | 5 | 2.0 | 2.0 |
| Ex. 21 | 550 | 570 | 1120 | 20 | 0.55 | 5 | 1.6 | 1.6 |
| Ex. 22 | 660 | 670 | 1330 | 10 | 0.55 | 5 | 2.2 | 2.2 |
| Ex. 23 | 630 | 640 | 1270 | 10 | 0.55 | 5 | 2.9 | 2.9 |
| Ex. 24 | 640 | 650 | 1290 | 10 | 0.48 | 5 | 2.6 | 2.6 |
| Ex. 25 | 570 | 610 | 1180 | 40 | 0.51 | 5 | 1.4 | 1.4 |

TABLE 1-continued

| | | | | | | | | |
|---|---|---|---|---|---|---|---|---|
| Ex. 26 | 530 | 550 | 1080 | 20 | 0.50 | 5 | 1.1 | 1.1 |
| Ex. 27 | 600 | 680 | 1280 | 80 | 0.55 | 5 | 2.0 | 2.0 |

| | main component polymer | | copolymer component | | stretching ratio | | heat-setting temperature | film thickness | plane orientation coefficient of film |
|---|---|---|---|---|---|---|---|---|---|
| | type | mol % | type | mol % | MD | TD | (° C.) | (μm) | (ns) |
| C. Ex. 1 | PEN | 100 | — | — | 3.8 | 4.0 | 210 | 150 | 0.265 |
| C. Ex. 2 | PEN | 100 | — | — | 3.8 | 4.0 | 210 | 150 | 0.265 |
| C. Ex. 3 | PEN | 100 | — | — | 3.8 | 4.0 | 210 | 150 | 0.265 |
| C. Ex. 4 | PEN | 100 | — | — | 3.8 | 4.0 | 210 | 150 | 0.265 |
| C. Ex. 5 | PEN | 100 | — | — | 3.8 | 4.0 | 210 | 150 | 0.265 |
| C. Ex. 6 | PEN | 100 | — | — | 3.8 | 4.0 | 210 | 150 | 0.265 |
| C. Ex. 7 | PEN | 100 | — | — | 2.0 | 2.0 | 210 | 150 | 0.240 |
| C. Ex. 8 | PEN | 100 | — | — | 3.8 | 4.0 | 255 | 150 | 0.247 |
| C. Ex. 9 | PEN | 100 | — | — | 3.8 | 4.0 | 210 | 150 | 0.262 |
| C. Ex. 10 | PEN | 75 | IA | 25 | 3.8 | 4.0 | 210 | 150 | 0.242 |
| C. Ex. 11 | PEN | 100 | — | — | 2.8 | 4.0 | 210 | 150 | 0.256 |

| | Young's modulus of film (kg/mm$^2$) | | total of Young's moduli in MD and TD | difference in Young's moduli between MD and TD in absolute value | intrinsic viscosity of film | surface roughness Ra of film | haze of film | haze of laminate film |
|---|---|---|---|---|---|---|---|---|
| | MD | TD | (kg/mm$^2$) | (kg/mm$^2$) | (dl/g) | (nm) | (%) | (%) |
| C. Ex. 1 | 650 | 660 | 1310 | 10 | 0.55 | 5 | 2.0 | 2.0 |
| C. Ex. 2 | 650 | 660 | 1310 | 10 | 0.55 | 5 | 2.0 | 2.0 |
| C. Ex. 3 | 650 | 660 | 1310 | 10 | 0.55 | 5 | 2.0 | 2.0 |
| C. Ex. 4 | 650 | 660 | 1310 | 10 | 0.55 | 5 | 2.0 | 2.0 |
| C. Ex. 5 | 650 | 660 | 1310 | 10 | 0.55 | 5 | 2.0 | 2.0 |
| C. Ex. 6 | 650 | 660 | 1310 | 10 | 0.55 | 5 | 2.0 | 2.0 |
| C. Ex. 7 | 430 | 440 | 870 | 10 | 0.55 | 5 | 1.4 | 1.4 |
| C. Ex. 8 | 580 | 590 | 1170 | 10 | 0.55 | 5 | 5.6 | 5.6 |
| C. Ex. 9 | 620 | 630 | 1250 | 10 | 0.42 | 5 | 2.8 | 2.8 |
| C. Ex. 10 | 420 | 460 | 880 | 40 | 0.48 | 5 | 1.0 | 1.0 |
| C. Ex. 11 | 520 | 630 | 1150 | 110 | 0.55 | 5 | 1.8 | 1.8 |

Ex.: Example
C. Ex.: Comparative Example
MD: longitudinal direction;
TD: transverse direction

TABLE 2

| | coating composition | | | | | | | |
|---|---|---|---|---|---|---|---|---|
| | water-soluble or dispersible polyester | | amide compound | | lubricant | | surfactant | |
| | type | wt % | type | wt % | type | wt % | type | wt % |
| Ex. 1 | P | 80 | A | 5 | G | 10 | Y | 5 |
| Ex. 2 | P | 80 | B | 5 | G | 10 | Y | 5 |
| Ex. 3 | Q | 80 | B | 5 | G | 10 | Y | 5 |
| Ex. 4 | R | 80 | B | 5 | G | 10 | Y | 5 |
| Ex. 5 | R | 80 | C | 5 | G | 10 | Y | 5 |
| Ex. 6 | R | 80 | D | 5 | G | 10 | Y | 5 |
| Ex. 7 | R | 80 | E | 5 | G | 10 | Y | 5 |
| Ex. 8 | R | 83 | B | 5 | H | 7 | Y | 5 |
| Ex. 9 | R | 80 | B/D | 3/2 | G | 10 | Y | 5 |
| Ex. 10 | R | 83 | B | 2 | G | 10 | Y | 5 |
| Ex. 11 | R | 82 | B | 3 | G | 10 | Y | 5 |
| Ex. 12 | R | 76 | B | 9 | G | 10 | Y | 5 |
| Ex. 13 | R | 74 | B | 11 | G | 10 | Y | 5 |
| Ex. 14 | R | 75 | B | 5 | G | 15 | Y | 5 |
| Ex. 15 | R | 60 | B | 5 | G | 30 | Y | 5 |
| Ex. 16 | R | 83 | B | 5 | H | 7 | Y | 5 |
| Ex. 17 | R | 80 | B | 5 | H | 10 | Y | 5 |
| Ex. 18 | R | 82 | B | 5 | G | 8 | Y | 5 |
| Ex. 19 | R | 85 | B | 5 | H | 5 | Y | 5 |
| Ex. 20 | R | 80 | C | 5 | G | 10 | Y | 5 |
| Ex. 21 | P | 80 | A | 5 | G | 10 | Y | 5 |
| Ex. 22 | P | 80 | A | 5 | G | 10 | Y | 5 |
| Ex. 23 | P | 80 | A | 5 | G | 10 | Y | 5 |
| Ex. 24 | P | 80 | A | 5 | G | 10 | Y | 5 |
| Ex. 25 | P | 80 | A | 5 | G | 10 | Y | 5 |
| Ex. 26 | P | 80 | A | 5 | G | 10 | Y | 5 |
| Ex. 27 | P | 80 | A | 5 | G | 10 | Y | 5 |
| C. Ex. 1 | P | 85 | — | — | G | 10 | Y | 5 |
| C. Ex. 2 | T | 80 | B | 5 | G | 10 | Y | 5 |
| C. Ex. 3 | S | 80 | B | 5 | G | 10 | Y | 5 |
| C. Ex. 4 | R | 85 | — | — | G | 10 | Y | 5 |
| C. Ex. 5 | R | 85 | B | 5 | G | 5 | Y | 5 |
| C. Ex. 6 | R | 87 | B | 5 | H | 3 | Y | 5 |
| C. Ex. 7 | P | 80 | A | 5 | G | 10 | Y | 5 |
| C. Ex. 8 | P | 80 | A | 5 | G | 10 | Y | 5 |
| C. Ex. 9 | P | 80 | A | 5 | G | 10 | Y | 5 |
| C. Ex. 10 | P | 80 | A | 5 | G | 10 | Y | 5 |
| C. Ex. 11 | P | 80 | A | 5 | G | 10 | Y | 5 |

Ex.: Example
C. Ex.: Comparative Example water-soluble or dispersible polyester composition of P (Tg=68° C.):
  acid component 90 mol % of terephthalic acid,
    6 mol % of isophthalic acid,
    4 mol % of potassium 5-sulfoisophthalate
  glycol component 95 mol % of ethylene glycol,
    5 mol % of neopentyl glycol
composition of Q (Tg=80° C.):
  acid component 50 mol % of 2,6-naphthalenedicarboxylic acid,
    46 mol % of terephthalic acid,
    4 mol % of sodium 5-sulfoisophthalate
  glycol component 70 mol % of ethylene glycol,
    30 mol % of bisphenol A adduct with 2 mol of ethylene oxide
composition of R (Tg=47° C.):
  acid component 85 mol % of terephthalic acid,
    15 mol % of isbphthalic acid
  glycol component 57 mol % of ethylene glycol,
    40 mol % of 1,4-butanediol,
    2 mol % of diethylene glycol,
    1 mol % (molecular weight: 600) of polyethylene glycol
composition of S (Tg=30° C.):
  acid component 70 mol % of terephthalic acid,
    28 mol % of isophthalic acid,
    2 mol % of sodium 5-sulfoisophthalate
  glycol component 70 mol % of ethylene glycol,
    30 mol % of bisphenol A adduct with 4 mol of ethylene oxide
composition of T (Tg=90° C.):
  acid component 81 mol % of 2,6-naphthalenedicarboxylic acid,
    15 mol % of isophthalic acid,
    4 mol % of sodium 5-sulfoisophthalate
  glycol component 70 mol % of ethylene glycol,
    30 mol % of bisphenol A adduct with 2 mol of ethylene oxide
amide compound
  A: N,N'-ethylenebiscaprylic acid amide
  B: N,N'-methylenebisstearic acid amide
  C: N,N'-ethylenebispalmitic acid amide
  D: caprylic acid amide
  E: stearic acid amide
lubricant
  G: acrylic resin fine particles (average particle diameter: 0.03 μm)
  H: silica (average particle diameter: 0.12 μm)
surfactant
  Y: polyoxyethylene nonylphenylether
  Z: polyoxyethylene-polyoxypropylene copolymer

TABLE 3

| | adhesion | friction coefficient (μs) | anti-blocking property | scratch resistance | reflectance (%) | glass shatterproof effect | overall evaluation |
|---|---|---|---|---|---|---|---|
| Ex. 1 | 4 | ○ | ○ | ○ | 0.7 | ○ | ◉ |
| Ex. 2 | 4 | ○ | ◉ | ○ | 0.7 | ○ | ◉ |
| Ex. 3 | 4 | ○ | ◉ | ○ | 0.7 | ○ | ◉ |
| Ex. 4 | 5 | ○ | ◉ | ○ | 0.7 | ○ | ◉ |
| Ex. 5 | 5 | ○ | ◉ | ○ | 0.7 | ○ | ◉ |
| Ex. 6 | 4 | ○ | ◉ | ○ | 0.7 | ○ | ◉ |
| Ex. 7 | 4 | ○ | ◉ | ○ | 0.7 | ○ | ◉ |
| Ex. 8 | 5 | ○ | ◉ | ○ | 0.7 | ○ | ◉ |
| Ex. 9 | 5 | ○ | ◉ | ○ | 0.7 | ○ | ◉ |
| Ex. 10 | 4 | ○ | ○ | ○ | 0.7 | ○ | ◉ |
| Ex. 11 | 5 | ○ | ◉ | ○ | 0.7 | ○ | ◉ |
| Ex. 12 | 5 | ○ | ◉ | ○ | 0.7 | ○ | ◉ |
| Ex. 13 | 4 | ○ | ◉ | ○ | 0.7 | ○ | ◉ |
| Ex. 14 | 5 | ◉ | ◉ | ○ | 0.7 | ○ | ◉ |
| Ex. 15 | 5 | ◉ | ◉ | ○ | 0.7 | ○ | ◉ |
| Ex. 16 | 5 | ◉ | ◉ | ○ | 0.7 | ○ | ◉ |
| Ex. 17 | 5 | ◉ | ◉ | ○ | 0.7 | ○ | ◉ |
| Ex. 18 | 5 | ○ | ○ | ○ | 0.7 | ○ | ◉ |
| Ex. 19 | 5 | ○ | ○ | ○ | 0.7 | ○ | ◉ |
| Ex. 20 | 4 | ○ | ◉ | ○ | 0.7 | ○ | ◉ |
| Ex. 21 | 4 | ○ | ○ | ○ | 0.7 | △ | ○ |
| Ex. 22 | 4 | ○ | ○ | ○ | 0.7 | ○ | ◉ |
| Ex. 23 | 4 | ○ | ○ | ○ | 0.7 | ○ | ◉ |
| Ex. 24 | 4 | ○ | ○ | ○ | 0.7 | △ | ○ |
| Ex. 25 | 4 | ○ | ○ | ○ | 0.7 | ○ | ◉ |
| Ex. 26 | 4 | ○ | ○ | ○ | 0.7 | △ | ○ |
| Ex. 27 | 4 | ○ | ○ | ○ | 0.7 | △ | ○ |
| C. Ex. 1 | 2 | ○ | ○ | ○ | 0.7 | ○ | X |
| C. Ex. 2 | 2 | ○ | ○ | ○ | 0.7 | ○ | X |
| C. Ex. 3 | 3 | ○ | △ | ○ | 0.7 | ○ | X |
| C. Ex. 4 | 1 | ○ | △ | ○ | 0.7 | ○ | X |
| C. Ex. 5 | 5 | X | △ | ○ | 0.7 | ○ | X |
| C. Ex. 6 | 5 | X | △ | ○ | 0.7 | ○ | X |
| C. Ex. 7 | 4 | ○ | ○ | ○ | 0.7 | X | X |
| C. Ex. 8 | 4 | ○ | ○ | ○ | 0.7 | X | X |
| C. Ex. 9 | 4 | ○ | ○ | ○ | 0.7 | X | X |

TABLE 3-continued

|  | adhesion | friction coefficient ($\mu s$) | anti-blocking property | scratch resistance | reflectance (%) | glass shatterproof effect | overall evaluation |
|---|---|---|---|---|---|---|---|
| C. Ex. 10 | 4 | ○ | ○ | ○ | 0.7 | X | X |
| C. Ex. 11 | 4 | ○ | ○ | ○ | 0.7 | X | X |

Ex.: Example
C. Ex.: Comparative Example

What is claimed is:

1. A laminate film for preventing glass from shattering, which comprises:
   (A) a biaxially oriented polyester film of a copolyester containing ethylene-2,6-naphthalenedicarboxylate recurring units in an amount of at least 80 mol % of all recurring units,
   (B) an adhesive coating film on at least one side of the above biaxially oriented polyester film, the adhesive coating film comprising a composition which contains a water-soluble or dispersible polyester having a secondary transition point of 40 to 85° C. and at least one amide compound selected from the group consisting of fatty acid amide and fatty acid bisamide,
   (C) a hard coat layer on the above adhesive coating film, with the proviso that when the adhesive coating film is formed on both sides of the biaxially oriented polyester film, the hard coat layer is formed on only one side of the adhesive coating films, and
   (D) an antireflection layer on the above hard coat layer.

2. The laminate film of claim 1, wherein the biaxially oriented polyester film (A) has a plane orientation coefficient of 0.250 or more.

3. The laminate film of claim 1, wherein the sum and difference of Young moduli in two directions intersecting at the right angle on the biaxially oriented polyester film
   (A) are 900 kg/mm² or more and 100 kg/mm² or less, respectively.

4. The laminate film of claim 1, wherein the biaxially oriented polyester film (A) comprises a copolyester having an intrinsic viscosity of 0.45 dl/g or more.

5. The laminate film of claim 1, wherein the biaxially oriented polyester film (A) has a thickness of 50 to 350 µm.

6. The laminate film of claim 1, wherein the biaxially oriented polyester film (A) has a haze of 5% or less.

7. The laminate film of claim 1, wherein the fatty acid amide in the adhesive coating film (B) is represented by the following formula:

$$R^1CONH_2$$

wherein $R^1$ is a saturated or unsaturated aliphatic group having 6 to 22 carbon atoms.

8. The laminate film of claim 1, wherein the fatty acid bisamide in the adhesive coating film (B) is represented by the following formula:

$$R^2CONHR^3NHCOR^4$$

wherein $R^2$ and $R^4$ are independently a saturated or unsaturated aliphatic group having 6 to 22 carbon atoms and $R^3$ is a saturated or unsaturated aliphatic group having 1 to 15 carbon atoms.

9. The laminate film of claim 1, wherein the adhesive coating film (B) contains the water-soluble or dispersible polyester in an amount of 20 to 97 wt % and the amide compound in an amount of 3 to 10 wt % based on the above composition.

10. The laminate film of claim 1, wherein the hard coat layer is a radiation-cured layer.

11. The laminate film of claim 1, wherein the antireflection layer has a laminate structure in which an oxide layer having a larger refractive index and an oxide layer having a smaller refractive index are laminated alternately.

12. The laminate film of claim 1, which has a haze of 5% or less.

13. A method for preventing glass from shattering at the time of its breakage by coating the surface of the glass with the laminate film of claim 1.

14. The method of claim 13, wherein the glass surface to be coated with the laminate film is the surface of the glass portion of an image display device.

15. An image display device, which has an outer glass surface coated with the laminate film of claim 1 in such a way that the antireflection layer is to be the outermost layer.

16. The image display device of claim 15, which is a Braun tube or plasma display.

17. A precursory laminate film for preventing glass from shattering, which comprises:
   (A) a biaxially oriented polyester film of a copolyester containing ethylene-2,6-naphthalene dicarboxylate recurring units in an amount of at least 80 mol % of all recurring units, and
   (B) an adhesive coating film on at least one side of the above biaxially oriented polyester film, the adhesive coating film comprising a composition which contains a water-soluble or dispersible polyester having a secondary transition point of 40 to 85° C. and at least one amide compound selected from the group consisting of fatty acid amide and fatty acid bisamide.

18. The precursory laminate film of claim 17, wherein the above adhesive coating film has a friction coefficient ($\mu s$) of 0.8 or less.

19. The precursory laminate film of claim 17, wherein the above adhesive coating film contains a lubricant having an average particle diameter of 0.15 µm or less in an amount of 5 to 30 wt % based on the adhesive coating film.

20. The laminate film of claim 17, wherein the adhesive coating film has a center line average surface roughness (Ra) of 2 to 10 nm on its surface which is not in contact with the biaxially oriented polyester film.

21. A base film for a laminate film for preventing glass shattering, which (A) comprises
   (a) a copolyester containing ethylene-2,6-naphthalenedicarboxylate recurring units in an amount of at least 80 mol % of all recurring units
   and which has (b) a plane orientation coefficient of 0.250 or more and
   (c) an intrinsic viscosity of 0.45 dl/g or more.

22. The base film of claim 21, which has a center line average surface roughness (Ra) of 10 nm or less.

* * * * *